(12) United States Patent
Schurr

(10) Patent No.: US 11,828,318 B2
(45) Date of Patent: Nov. 28, 2023

(54) INTEGRALLY FORMED THREAD LOCK RETENTION FEATURE

(71) Applicant: WHIRLPOOL CORPORATION, Benton Harbor, MI (US)

(72) Inventor: Daniel A Schurr, Wyoming, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 18/080,018

(22) Filed: Dec. 13, 2022

(65) Prior Publication Data

US 2023/0107152 A1   Apr. 6, 2023

Related U.S. Application Data

(62) Division of application No. 16/225,956, filed on Dec. 19, 2018, now Pat. No. 11,566,654.

(51) Int. Cl.
*H01G 2/04* (2006.01)
*F16B 37/08* (2006.01)
*F16B 29/00* (2006.01)

(52) U.S. Cl.
CPC .......... *F16B 37/0842* (2013.01); *F16B 29/00* (2013.01); *H01G 2/04* (2013.01); *F16B 2200/10* (2018.08)

(58) Field of Classification Search
CPC ...... F16B 33/006; F16B 37/00; F16B 39/106; F16B 39/284; F16B 21/073; F16B 37/0842; F16B 2/005; F16B 2/08; F16B 37/044; F16B 2200/10; F16B 21/084; F16B 37/042; H01G 2/04; H01G 2/106; H01G 11/82; H01G 9/08; D06F 58/20; D06F 39/12; D06F 58/04; H05K 3/301
USPC ........................................................ 411/433
See application file for complete search history.

(56) References Cited

U.S. PATENT DOCUMENTS

| 3,698,260 | A | 10/1972 | Shellhause |
| 4,990,044 | A | 2/1991 | Kimak |
| 5,526,657 | A | 6/1996 | Johnson |
| 5,561,588 | A | 10/1996 | Michel et al. |
| 5,624,150 | A | 4/1997 | Venier |
| 7,206,185 | B2 | 4/2007 | Tsunezaki et al. |
| 8,198,534 | B2 | 6/2012 | Hotz et al. |
| 9,190,821 | B2 | 11/2015 | Kwasiborski |
| 9,303,678 | B2 | 4/2016 | Ducornait et al. |
| 9,564,269 | B2 * | 2/2017 | Zhang .................... H01G 11/82 |

(Continued)

FOREIGN PATENT DOCUMENTS

| CN | 1132538 A | 10/1996 |
| CN | 204067046 U | 12/2014 |

(Continued)

*Primary Examiner* — Mandeep S Buttar
(74) *Attorney, Agent, or Firm* — Price Heneveld LLP

(57) ABSTRACT

A laundry appliance includes a basement housing comprising a capacitor receiver. A capacitor is disposed within the capacitor receiver to define a secured position. The capacitor receiver includes at least one retaining flange that is coupled to the basement housing via a living hinge. At least one retaining flange is outwardly biased away from a body of the capacitor when the capacitor is placed in an inserted position. At least one retaining flange includes a thread-engaging surface that operates to the secured position upon rotation of the capacitor in the inserted position.

20 Claims, 9 Drawing Sheets

(56) References Cited

U.S. PATENT DOCUMENTS

| | | | |
|---|---|---|---|
| 9,605,369 B2 | 3/2017 | Bae et al. | |
| 10,288,106 B2 * | 5/2019 | Lemacks | F16B 37/044 |
| 10,323,674 B2 * | 6/2019 | Sbongk | F16B 37/0842 |
| 10,781,550 B2 | 9/2020 | Mazzarella et al. | |
| 11,319,127 B2 * | 5/2022 | Beyer | B65D 63/18 |
| 2004/0136170 A1 | 7/2004 | Tsunezaki et al. | |
| 2009/0091222 A1 | 4/2009 | Jang et al. | |
| 2014/0366590 A1 | 12/2014 | Bae et al. | |
| 2019/0390394 A1 | 12/2019 | Mazzarella et al. | |
| 2020/0200208 A1 * | 6/2020 | Schurr | H01G 2/04 |
| 2020/0347871 A1 * | 11/2020 | Wilson | F16B 37/0857 |

FOREIGN PATENT DOCUMENTS

| | | |
|---|---|---|
| CN | 205775362 U | 12/2016 |
| CN | 207485787 U | 6/2018 |
| DE | 2844412 A1 | 4/1980 |
| DE | 3807626 A1 | 11/1989 |
| DE | 4444212 A1 | 6/1996 |
| DE | 102007010090 A1 | 11/2007 |
| DE | 102007052073 B3 | 2/2009 |
| EP | 46263 A2 | 2/1982 |
| GB | 1330813 A | 9/1973 |
| KR | 1020070062281 A | 6/2007 |
| KR | 1020080058776 A | 6/2008 |

\* cited by examiner

INTEGRALLY FORMED THREAD LOCK RETENTION FEATURE

CROSS REFERENCE TO RELATED APPLICATION

The present application is a divisional and claims priority of U.S. patent application Ser. No. 16/225,956 filed Dec. 19, 2018, now U.S. Pat. No. 11,566,654, entitled INTEGRALLY FORMED THREAD LOCK RETENTION FEATURE, the entire disclosure of which is hereby incorporated herein by reference.

FIELD OF THE DEVICE

This device is in the field of retaining features, and more specifically, a thread lock retention feature that is integrally formed within an appliance substrate.

SUMMARY

In at least one aspect, a laundry appliance includes a basement housing comprising a capacitor receiver. A capacitor is disposed within the capacitor receiver to define a secured position. The capacitor receiver includes at least one retaining flange that is coupled to the basement housing via a living hinge. At least one retaining flange is outwardly biased away from a body of the capacitor when the capacitor is placed in an inserted position. At least one retaining flange includes a thread-engaging surface that operates to the secured position upon rotation of the capacitor in the inserted position.

In at least another aspect, a basement for a laundry appliance includes a basement panel comprising an electrical-component receiver. An electrical component has a threaded stud that is axially inserted into the electrical-component receiver to define a secured position. The electrical-component receiver includes opposing retaining flanges that are coupled to the basement panel via respective living hinges. The electrical-component receiver is free of internal recesses and includes a thread protrusion at each retaining flange of the opposing retaining flanges. The opposing retaining flanges are outwardly biased when the electrical component is placed in an inserted position. The opposing retaining flanges are moved to the secured position when the electrical component is rotated in the inserted position, whereby each single thread protrusion engages the threaded stud of the electrical component.

In at least another aspect, a method for assembling a laundry appliance includes forming a basement panel within a mold. The basement panel includes an integral thread-lock receiver having opposing retaining flanges that are coupled to the basement panel via living hinges. The mold, at least at a location of the capacitor thread-lock receiver, is a two-piece mold that is free of lifters. A capacitor is linearly inserted into the thread-lock receiver to define an inserted position. The opposing retaining flanges are biased outwardly and away from a body of the capacitor. The capacitor is rotated in the inserted position to operate the opposing retaining flanges toward the body of the capacitor to define a secured position.

These and other features, advantages, and objects of the present device will be further understood and appreciated by those skilled in the art upon studying the following specification, claims, and appended drawings.

DETAILED DESCRIPTION OF EMBODIMENTS

Figure 1:
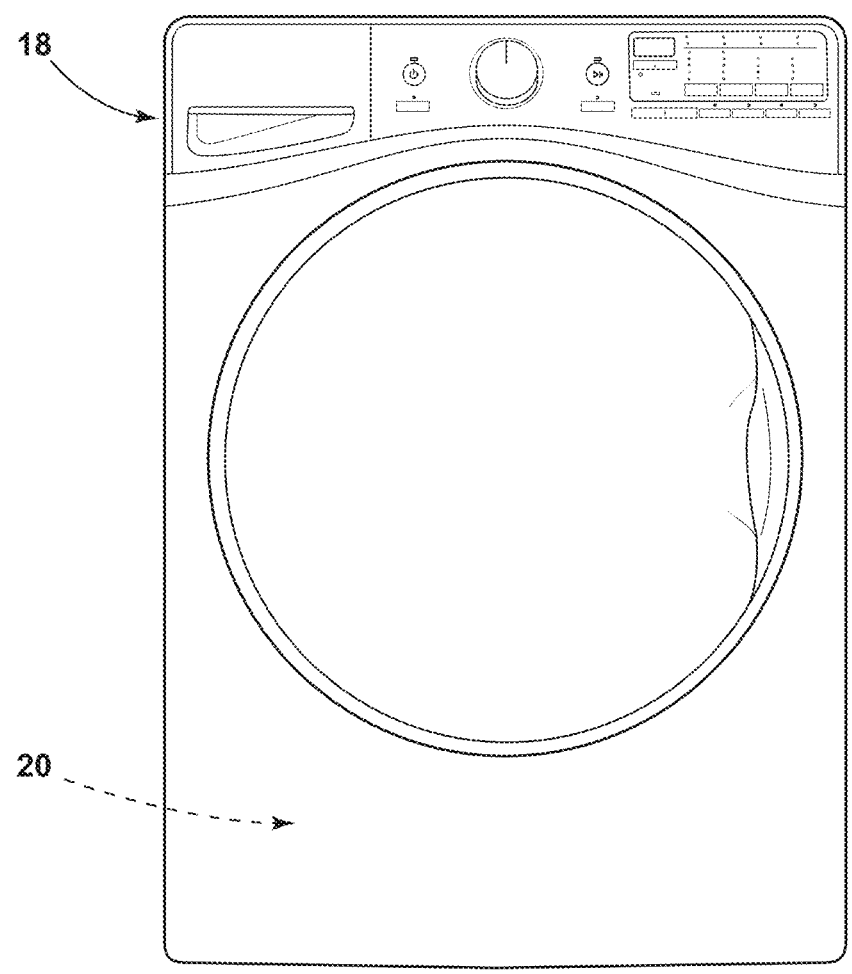
FIG. 1 is an elevational view of a laundry appliance incorporating an aspect of the thread-lock receiver for attaching an electrical component to a portion of the appliance.
Figure 2:
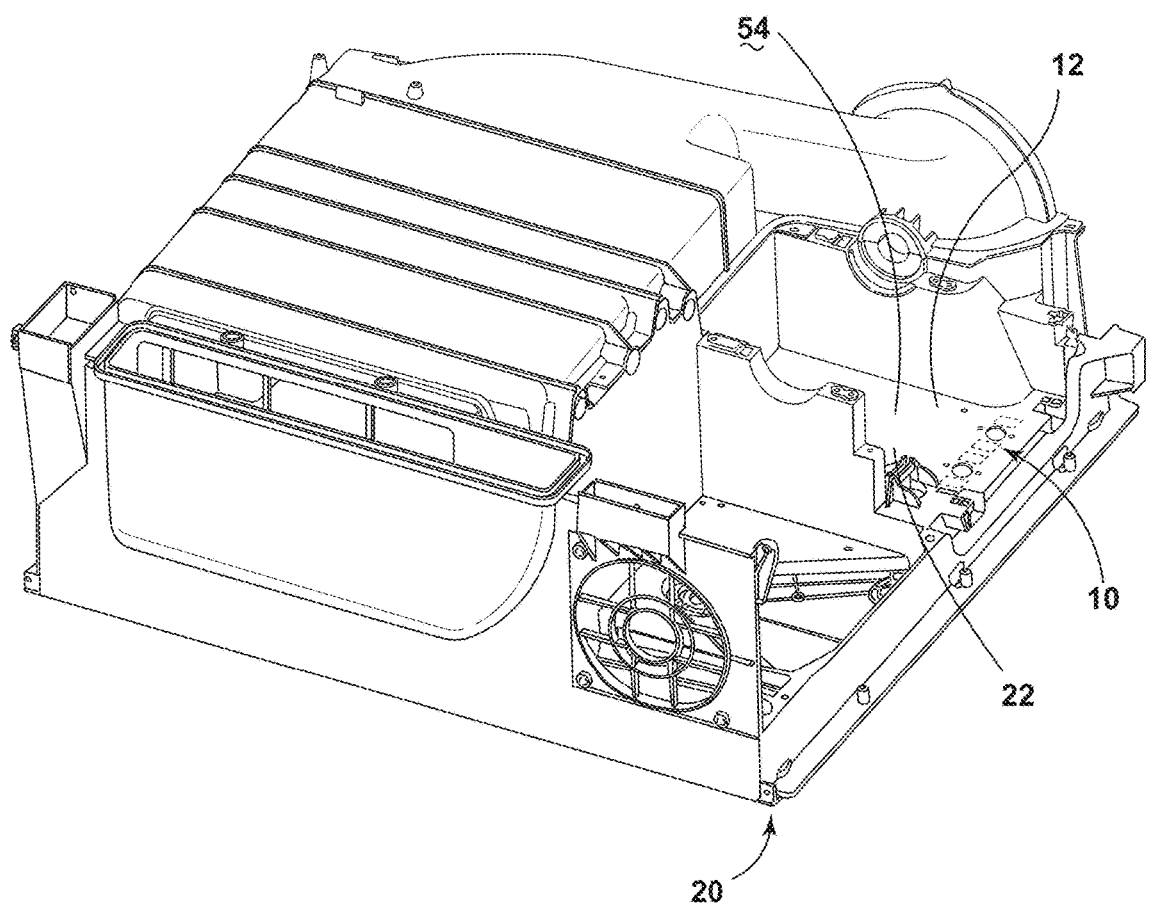
FIG. 2 is a top perspective view of a basement for a laundry appliance and illustrating an aspect of the appliance substrate that incorporates the integral thread-lock receiver.
Figure 3:
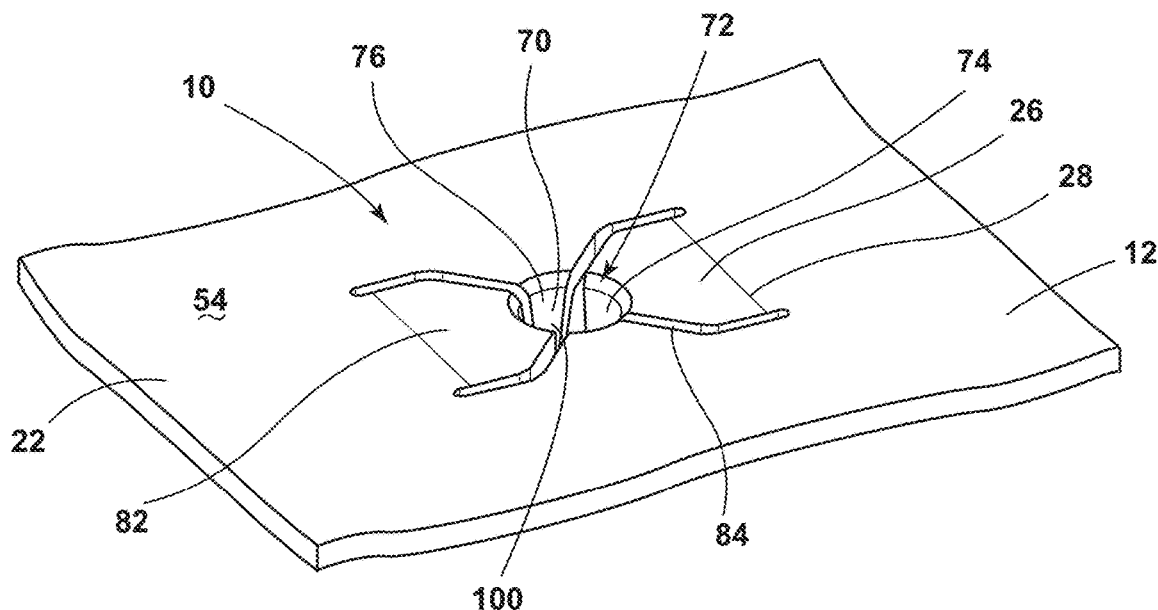
FIG. 3 is a top perspective view of a cut-away portion of the appliance substrate and illustrating an aspect of the integral thread-lock receiver.
Figure 4:
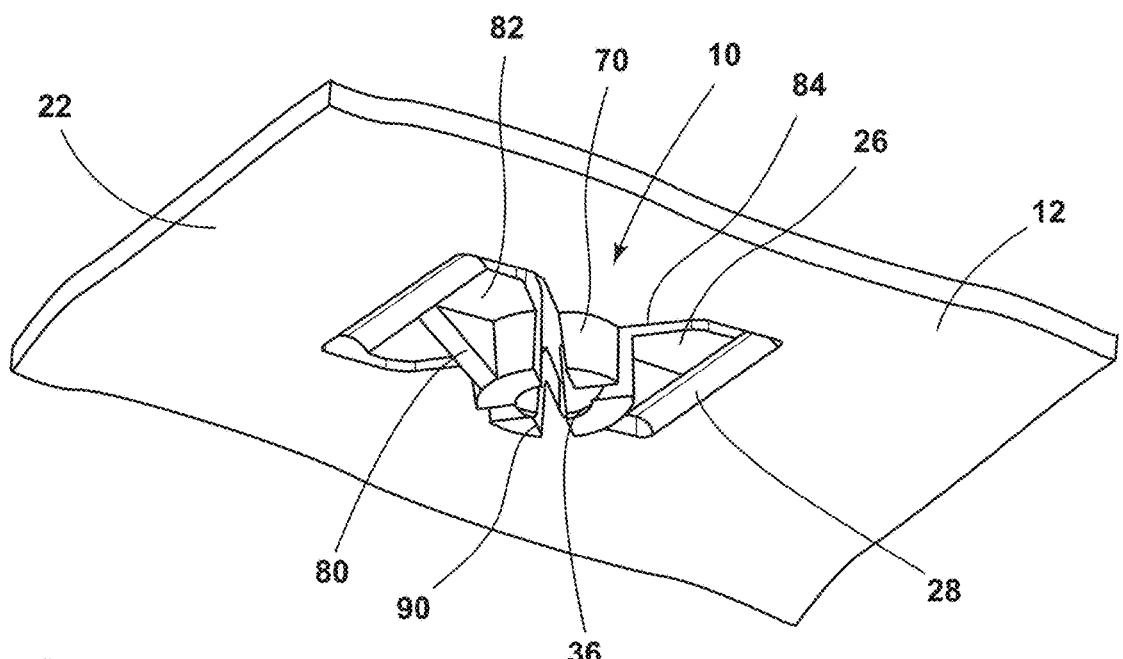
FIG. 4 is a bottom perspective view of the cut-away portion of the thread-lock receiver of FIG. 3.
Figure 5:
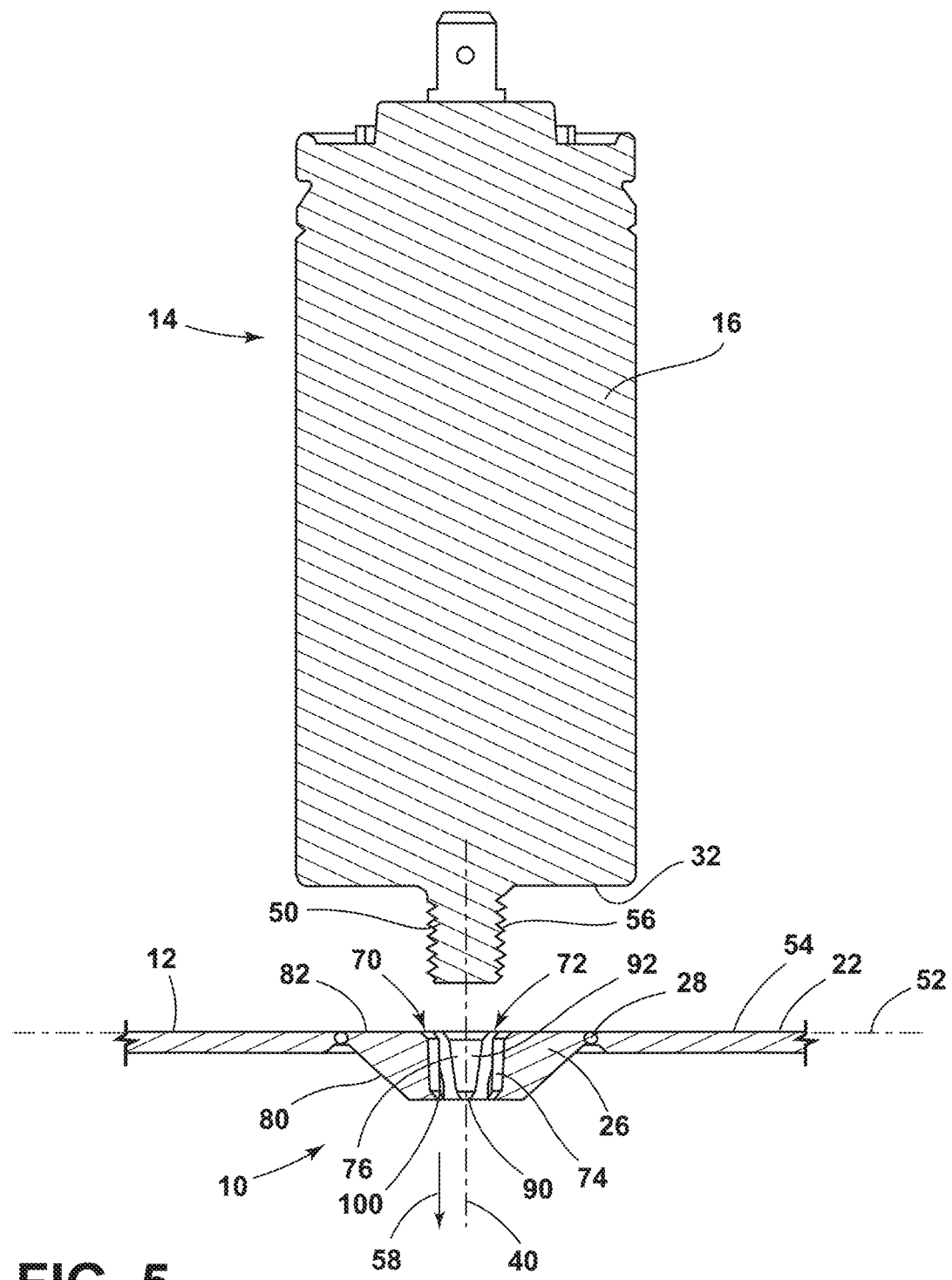
FIG. 5 is a cross-sectional view of the cut-away portion of the thread-lock receiver of FIG. 3 and showing a threaded stud for an electrical component moving into an inserted position.
Figure 6:
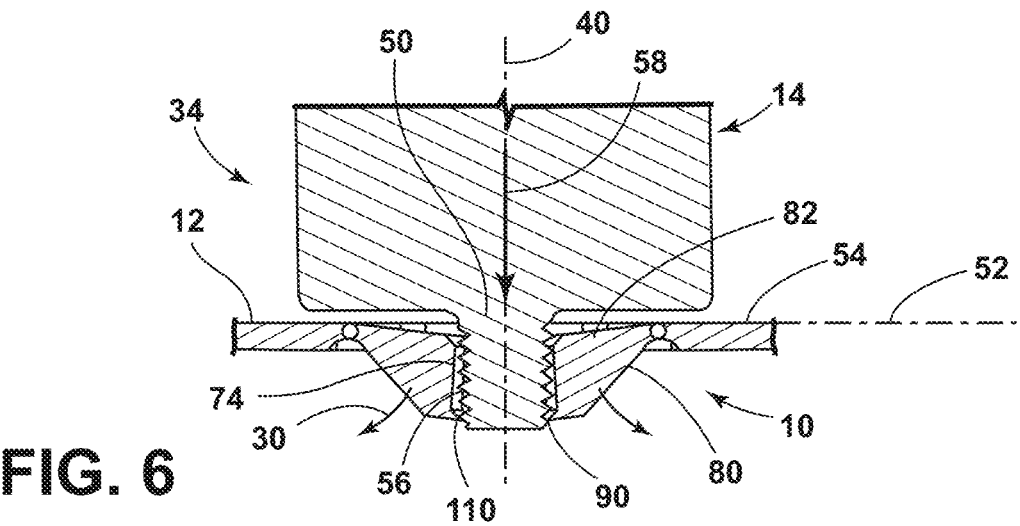
FIG. 6 is a cross-sectional view of the thread-lock receiver of FIG. 5 and showing the threaded stud in the inserted position.
Figure 7:
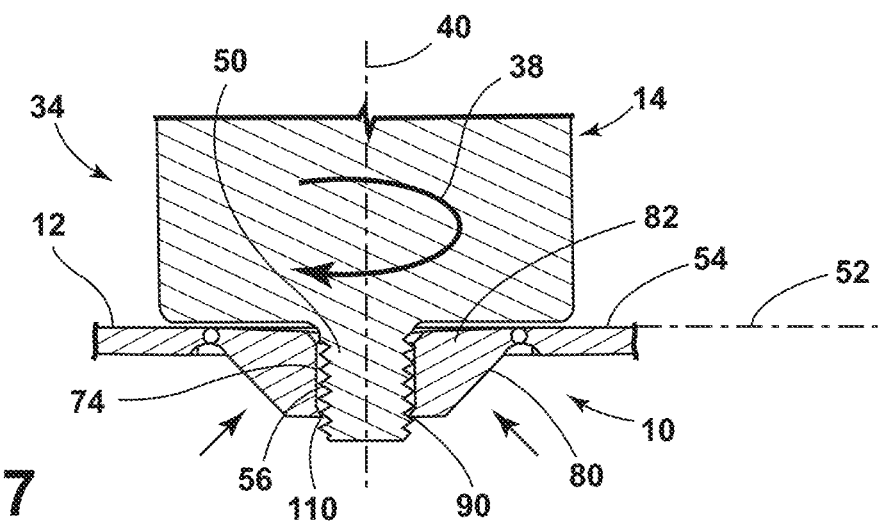
FIG. 7 is a cross-sectional view of the thread-lock receiver of FIG. 6 and showing the threaded stud and related electrical component being rotated into the secured position.
Figure 8:
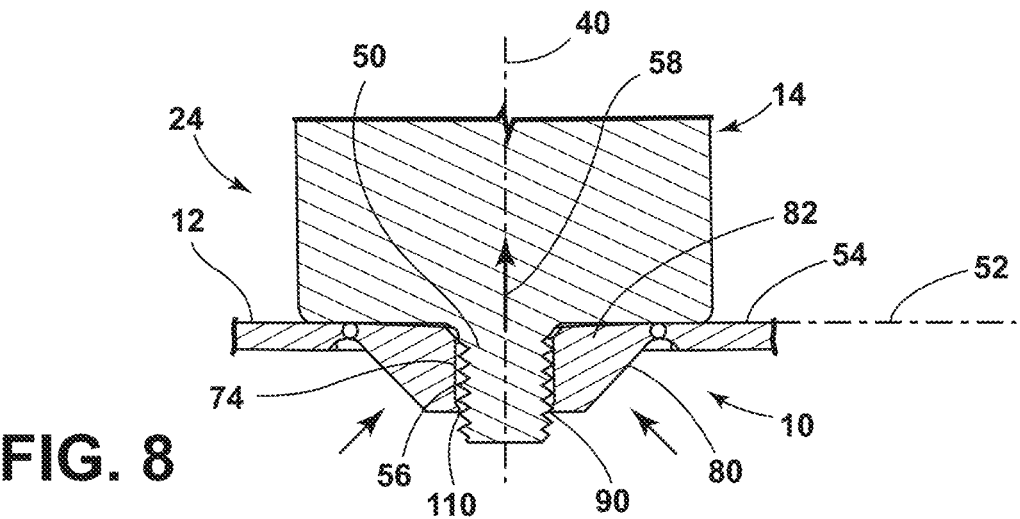
FIG. 8 is a cross-sectional view of the thread-lock receiver of FIG. 7 shown in the secured position.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With respect to FIGS. 1-11, reference numeral 10 generally refers to a thread-lock receiver that is integrally formed within a substrate 12 or structural component of an appliance 18. The thread-lock receiver 10 can serve as a capacitor receiver or other electrical-component receiver, according to various embodiments. Typically, the thread-lock receiver 10 will be used to attach an electrical component 14, such as a capacitor 16, to the substrate 12. The use of the thread-lock receiver 10 serves to secure the electrical component 14 to the substrate 12 for the appliance 18. According to various aspects of the device, the laundry appliance 18 can include a basement housing 20 having a substrate 12, typically in the form of a basement panel 22. The basement panel 22 or other portion of the basement housing 20 can include an aspect of the thread-lock receiver 10 that is configured to receive a capacitor 16 or other electrical component 14. The capacitor 16 is positioned within the thread-lock receiver 10 to define a secured position 24. It is contemplated that the thread-lock receiver 10 includes at least one retaining flange 26 that is coupled to the basement housing 20 via a living hinge 28. The retaining flange 26 is outwardly biased 30 away from the body 32 of the capacitor 16 when the capacitor 16 is placed in an inserted position 34 within the thread-lock receiver 10. The retaining flange 26 includes a thread-engaging surface 36 that operates toward the secured position 24 upon a rotational operation 38 of the capacitor 16 about a rotational axis 40, while the capacitor 16 is in the inserted position 34. Accordingly, the thread-lock receiver 10 is integrally formed within the basement housing 20, and typically within the basement panel 22.

Referring again to FIGS. 2-11, typically, the capacitor 16 or other electrical component 14 will include a threaded stud 50 that linearly and rotationally engages the thread-lock receiver 10 to define the secured position 24. When the electrical component 14 is in the secured position 24, the secured position 24 is further defined by the at least one retaining flange 26 engaging a body 32 of the capacitor 16. With the at least one retaining flange 26 engaging the body 32 of the capacitor 16, and the threaded stud 50 located within the thread-lock receiver 10, the electrical component 14 is substantially locked in position within the thread-lock receiver 10.

Referring again to FIGS. 5-11, when the electrical component 14 is moved, typically in an axial direction 58, along the rotational axis 40, toward the inserted position 34, movement of the threaded stud 50 between the opposing retaining flanges 26 causes the opposing retaining flanges 26 to be outwardly biased 30 in the direction that the electrical component 14 is inserted. The opposing retaining flanges 26 are moved away from the plane 52 that is defined by a top surface 54 of the basement panel 22 for the basement housing 20. In the inserted position 34, the electrical component 14 may not be fully inserted into the thread-lock receiver 10. The inserted position 34 is defined by the thread-engaging surface 36 of the opposing retaining flanges 26, engaging a portion of the threads 56 for the threaded stud 50. In this manner, when the electrical component 14 undergoes a rotational operation 38, the thread-engaging surfaces 36 of the opposing retaining flanges 26 operates along the threads 56 of the threaded stud 50. This threaded engagement between the threaded stud 50 and the opposing retaining flanges 26 causes the opposing retaining flanges 26 to be moved toward the body 32 of the capacitor 16. Contemporaneously, rotational operation 38 of the electrical component 14 also serves to move the electrical component 14 in the axial direction 58 and toward the top surface 54 of the basement panel 22. When the electrical component 14 is fully rotated, the opposing retaining flanges 26 are secured against the body 32 of the electrical component 14 and the electrical component 14 is also secured against the top surface 54 of the basement panel 22. These engagements serve to maintain the electrical component 14 within the thread-lock receiver 10 during manufacture, transport, storage and use of the particular appliance 18.

Referring again to FIGS. 3-11, each opposing retaining flange 26 of the thread-lock receiver 10 can be attached to the basement panel 22 via a living hinge 28. Accordingly, the thread-lock receiver 10 is integrally formed within the basement housing 20 and the basement panel 22 as a single, integral and continuous piece.

Referring again to FIGS. 3-11, the thread-lock receiver 10 includes a perimeter wall 70 that defines a central aperture 72 into which the threaded stud 50 of the electrical component 14 is inserted and rotationally operated. The perimeter wall 70 for the thread-lock receiver 10 is typically segmented. The various segments of the perimeter wall 70 can include operable segments 74 that are coupled with the opposing retaining flanges 26. Fixed segments 76 of the perimeter wall 70 are alternately positioned with respect to the operable segments 74. The fixed segments 76 of the perimeter wall 70 are typically in the stationary position as the threaded stud 50 moves in the axial direction 58 through the central aperture 72 defined by the thread-lock receiver 10. Conversely, as the threaded stud 50 moves through the central aperture 72, the operable segments 74 are moved or outwardly biased 30 in the same direction that the threaded stud 50 is moving through the central aperture 72.

Referring again to FIGS. 3-11, the opposing retaining flanges 26 of the thread-lock receiver 10 can include buttresses 80 that extend between a planar portion 82 of the retaining flange 26 and the operable segment 74 of the retaining flange 26 that forms the perimeter wall 70. Typically, the planar portion 82 is adapted to engage the remainder of the basement panel 22 via the living hinge 28. The buttress 80 can extend from the operable segment 74 to the planar portion 82 so that the operable segment 74 does not substantially bend or deflect with respect to the planar portion 82 and the retaining flange 26 is able to rotate to the inserted position 34 as a single piece and with minimal internal bending or deflection. Flanking each of the opposing retaining flanges 26, and separating the fixed segments 76 and operable segments 74 of the perimeter wall 70 are a plurality of spacing channels 84 extending from opposing ends of the living hinges 28 and extending toward the central aperture 72. In this manner, the spacing channels 84 also serve to separate the perimeter wall 70 into the fixed segments 76 and operable segments 74.

Referring again to FIGS. 3-11, it is contemplated that the thread-engaging surface 36 includes an outer thread member that can be defined at a point 90 of each of the fixed segments 76 and operable segments 74 of the perimeter wall 70 for the thread-lock receiver 10. According to various aspects of the device, the thread-engaging surface 36 may only be located on operable segments 74 of the perimeter wall 70. Additionally, within the fixed segments 76 of the perimeter wall 70, the threads 56 for the threaded stud 50 can become embedded as the electrical component 14 is rotationally operated from the inserted position 34 to the secured position 24. In this manner, as the electrical component 14 is rotationally operated, threads 56 of the threaded stud 50 rotate within the central aperture 72 of the thread-lock receiver 10 and about the rotational axis 40. These threads 56 may tend to cut into or otherwise be embossed within the inside surface 92 of the perimeter wall 70 that defines the central aperture 72. The threads 56 of the threaded stud 50 cutting into the inside surface 92 of the perimeter wall 70 provides an added retaining feature between the threaded stud 50 for the electrical component 14 and the thread-lock receiver 10. In this manner, the thread-engaging surface 36 of the operable segments 74 for the perimeter wall 70 and the inside surface 92 for the fixed segments 76 of the perimeter wall 70 cooperate to define a secure engagement of the electrical component 14 within the thread-lock receiver 10.

Figure 9:
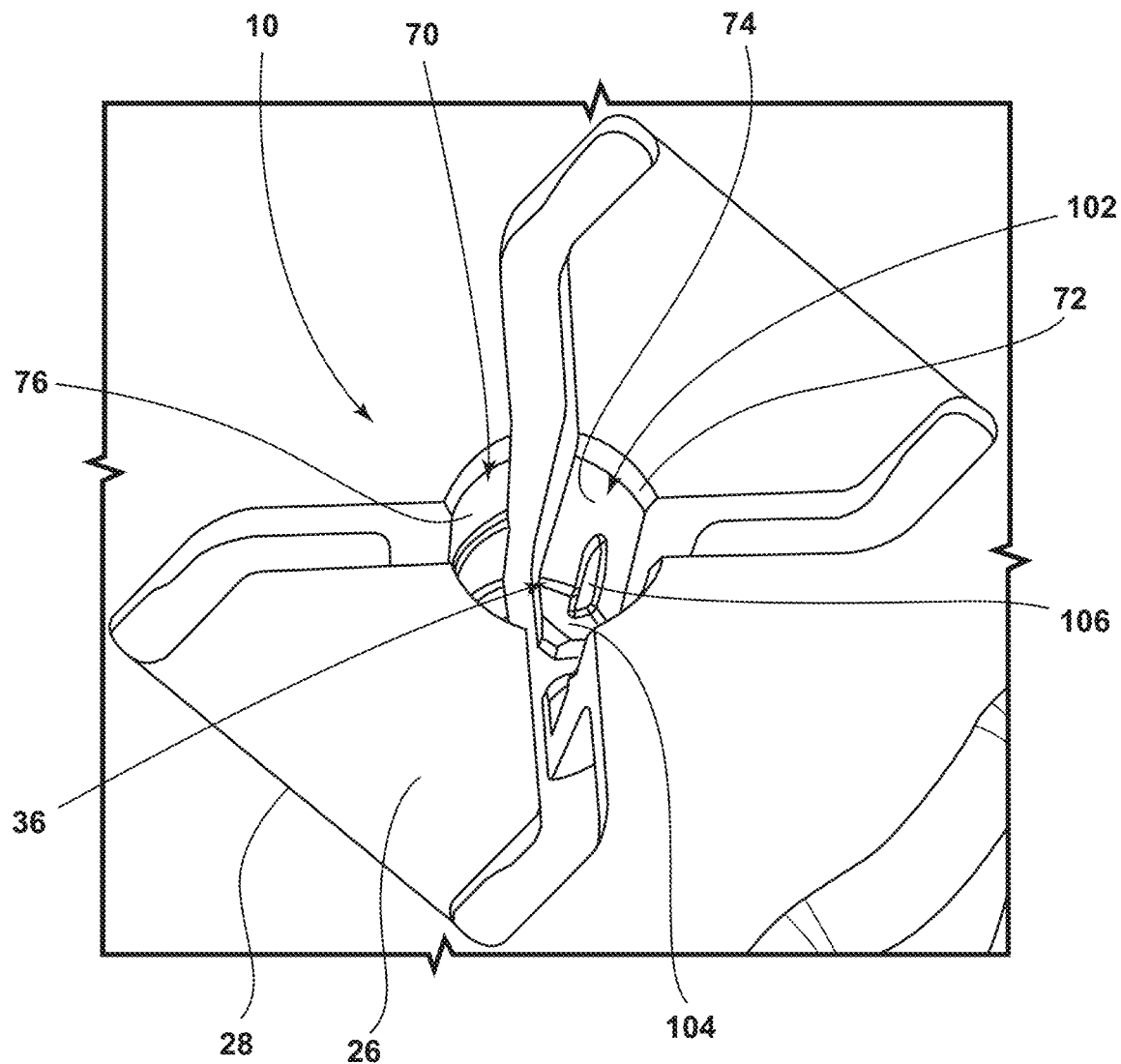
FIG. 9 is a top perspective view of an aspect of a thread-lock receiver that includes a cage structure that surrounds the threaded stud for the capacitor.
Figure 10:
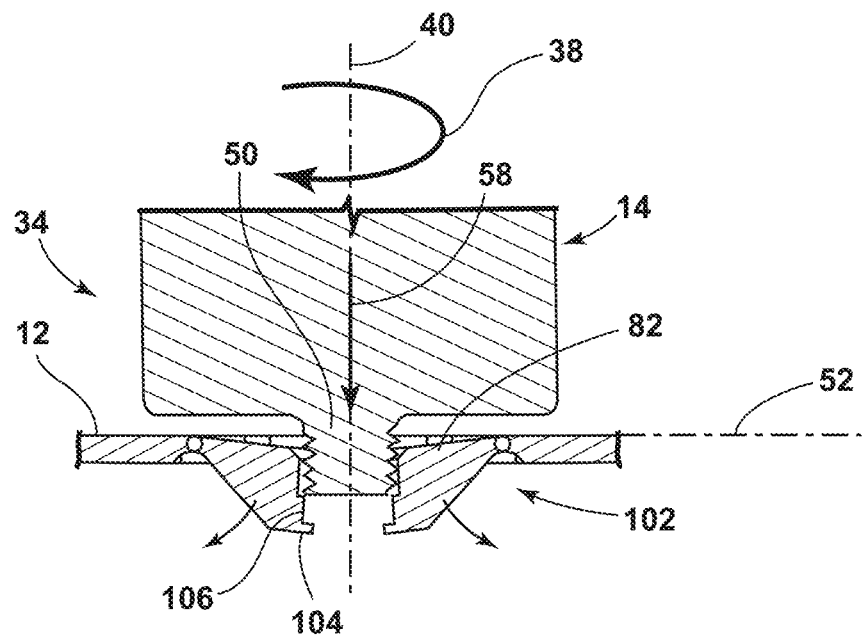
FIG. 10 is a cross-sectional view of the thread-lock receiver of FIG. 9 and showing the capacitor in the inserted position.
Figure 11:
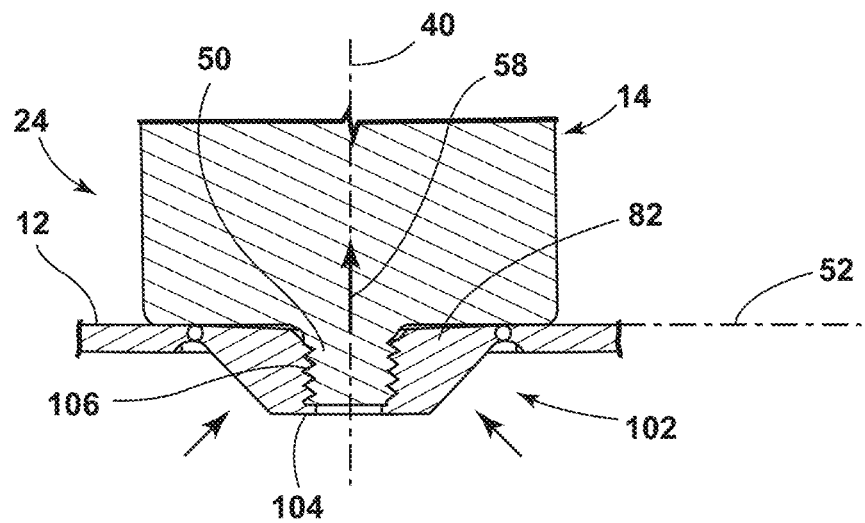
FIG. 11 is a cross-sectional view of the thread-lock receiver of FIG. 10 and showing the capacitor in the secured position.
Figure 12:
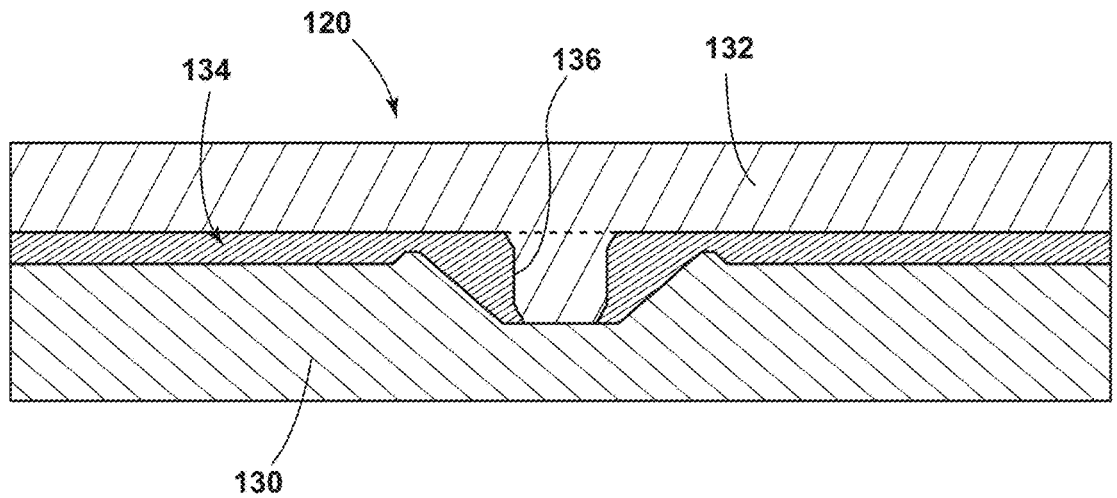
FIG. 12 is a cross-sectional view of a two-piece mold used to form an aspect of the appliance substrate incorporating an aspect of the integral thread-lock receiver.
Figure 13:
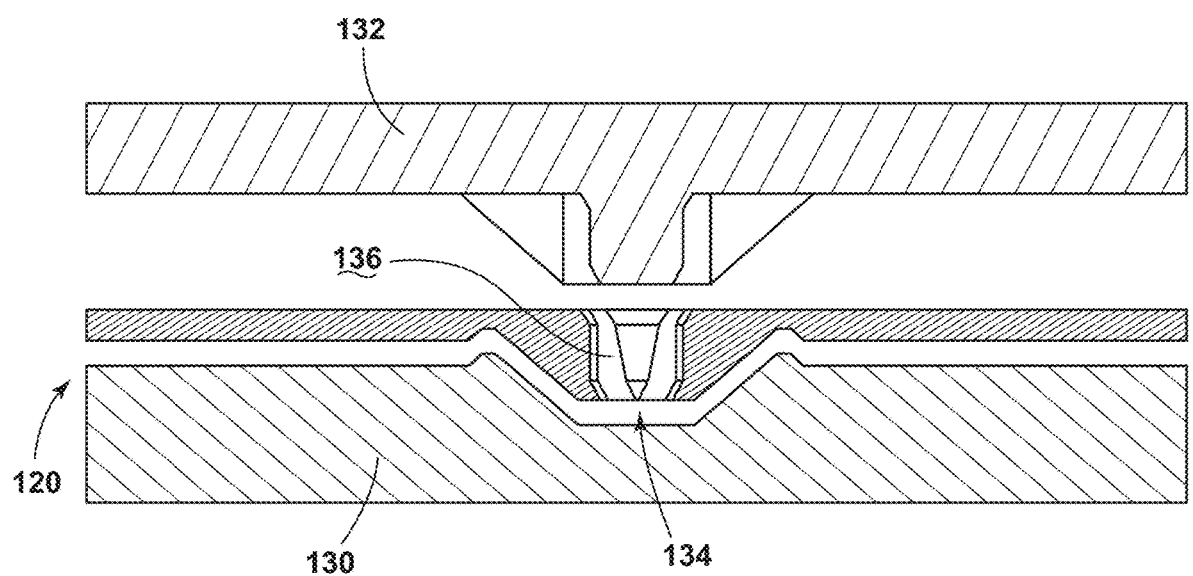
FIG. 13 is a cross-sectional view of the mold of FIG. 12 showing the two-piece mold separated and the substrate incorporating the integral thread-lock receiver being removed from the mold.
Figure 14:
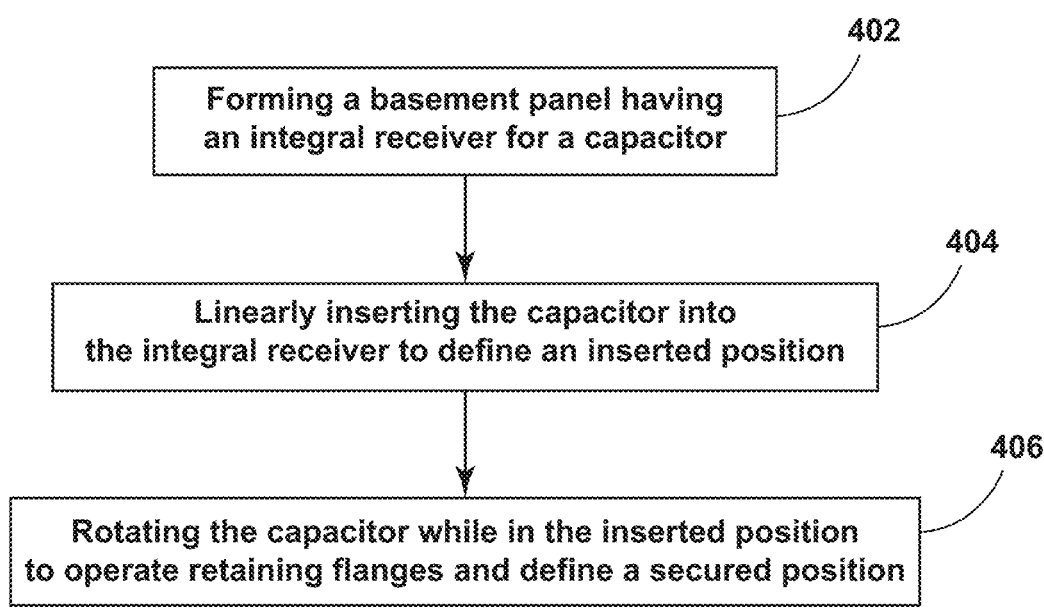
FIG. 14 is a linear flow diagram illustrating a method for assembling a laundry appliance.

Referring now to FIGS. 9-11, according to various aspects of the device, the thread-lock receiver 10 can include a cage structure 102 where the retaining flanges 26 include covering ends 104 that are adapted to surround the threaded stud 50 of the electrical component 14. In this manner, when the electrical component 14 is in the secured position 24, the threaded stud 50 is protected by the cage structure 102 for the thread-lock receiver 10.

Referring again to FIGS. 9-11, when the electrical component 14 is moved into the thread-lock receiver 10 to define the inserted position 34, biasing ribs 106 that are defined within the operable segments 74 of the perimeter wall 70 are adapted to engage the threaded stud 50 of the electrical component 14. When the threaded stud 50 engages the biasing ribs 106, the retaining flange 26 is outwardly biased 30 away from the body 32 of the electrical component 14. When the electrical component 14 undergoes a rotational operation 38, the threads 56 of the threaded stud 50 are configured to cut into the biasing ribs 160. Through this rotational operation 38, the threads 56 for the threaded stud 50 are configured to rotationally engage the biasing ribs 106 to inwardly bias the retaining flanges 26 toward the secured position 24. At the same time, the threads 56 for the threaded stud 50 cooperate with the biasing ribs 106 to draw the electrical component 14 toward the top surface 54 of the basement panel 22. When the threaded stud 50 is moved into the secured position 24, the threaded stud 50 is contained between the retaining flanges 26 and the covering ends 104 that define the cage structure 102. It is contemplated that the fixed segments 76 of the perimeter wall 70 include covering ends 104 that further define the cage structure 102. Through this configuration, the threaded stud 50 of the electrical component 14 is contained within the cage structure 102 of the thread-lock receiver 10. By being retained within the cage structure 102, the threaded stud 50 is protected from contact that might result in electrical shock, short circuit, or other similar undesirable occurrence.

In various aspects of the device, the thread-lock receiver 10 can include at least one supplemental surface 100 that can be defined by the inside surface 92 of the fixed segments 76 for the perimeter wall 70. As discussed above, the supplemental surfaces 100 are typically adjacent to the opposing retaining flanges 26 such that the fixed segments 76 and operable segments 74 are placed in a generally alternating configuration. Again, the secured position 24 of the electrical component 14 can be further defined by the threads 56 of the threaded stud 50 being partially embedded within or cut into at least one of the supplemental surfaces 100 or inside surfaces 92 that are defined by the fixed segments 76 for the perimeter wall 70.

Referring again to FIGS. 1-11, the substrate 12 that includes the thread-lock receiver 10 can be in the form of a basement panel 22 included within a basement housing 20 for a laundry appliance 18. It is also contemplated that the thread-lock receiver 10 can be included within a substrate 12 for various other appliances 18. Such appliances 18 can include, but are not limited to, refrigerators, freezers, dishwashers, coolers, hot water heaters, air conditioners, disposals, ovens, small appliances, and other similar household and commercial appliances and fixtures.

Referring again to FIGS. 1-11, a laundry appliance 18 can include a basement housing 20 that includes the basement panel 22. As discussed above, the thread-lock receiver 10 can be integrally formed within the basement panel 22. The electrical component 14 includes the threaded stud 50 that is axially inserted into the thread-lock receiver 10 to define the secured position 24. The thread-lock receiver 10 includes the opposing retaining flanges 26 that are coupled to the basement panel 22 via respective living hinges 28. The thread-lock receiver 10 is free of internal recesses and can include a thread-engaging surface 36 in the form of a thread protrusion 110 near an end of each retaining flange 26 of the opposing retaining flanges 26. The opposing retaining flanges 26 are outwardly biased 30 when the electrical component 14 is placed in the inserted position 34. The opposing retaining flanges 26 are then moved into the secured position 24 when the electrical component 14 is rotationally operated, while in the inserted position 34. As the electrical component 14 is rotationally operated, each thread protrusion 110 engages the threaded stud 50 of the electrical component 14 and moves along the threads 56 to be moved toward the body 32 of the electrical component 14. As discussed above, the secured position 24 of the electrical component 14 is defined by the opposing retaining flanges 26 engaging the body 32 of the electrical component 14, and the electrical component 14 also engaging a planar top surface 54 of the basement panel 22.

According to various aspects of the device, the electrical component 14 can be in the form of a capacitor 16, transistor, light, diode, resistor, or other similar electrical component 14 that may be threadably installed within a substrate 12. According to various aspects of the device, the thread-lock receiver 10 may also be used to attach other components for the appliance 18. Such other components may be parts of an electrical circuit or may be mechanical or other electrical components 14 of the appliance 18 that can be attached to the substrate 12 for that appliance 18.

Referring now to FIGS. 1-13, the basement panel 22 and/or the basement housing 20 can be an injection molded member. In such an embodiment, the thread-lock receiver 10 is integrally formed as part of the injection molded member. In this manner, the thread-lock receiver 10 includes a plurality of surfaces that are substantially perpendicular to the planar top surface 54 of the basement panel 22. Additionally, the thread-lock receiver 10 is free of internal recesses that may require lifters or other additional molding components to be used during formation of a basement panel 22. By not including lifters in the molding process for forming the basement panel 22, the mold 120 that is used to form the basement panel 22 having the thread-lock receiver 10 can be in the form of a two-piece mold 120 that can be operated in a single direction. Again, no lifters are typically necessary within the mold 120 for forming the basement panel 22 that includes the integral thread-lock receivers 10.

It is contemplated that the basement panel 22 may include a single thread-lock receiver 10 or may include a plurality of thread-lock receivers 10. In either instance, the configuration of each thread-lock receiver 10 is conducive to the use of a two-piece mold 120 that is free of lifters within the mold 120. Typically, lifters are used for forming internal cavities. In such an instance, the lifters are separately operated from the remainder of the conventional mold and typically make the molding operation more complex and more time consuming. By using the configuration of the thread-lock receiver 10 that can be formed in a mold 120 without the use of lifters, the process for forming the basement panel 22 can be faster and more efficient.

Referring now to FIGS. 1-14, having described various aspects of the basement panel 22 having the integral thread-lock receiver 10, a method 400 is disclosed for assembling a laundry appliance 18. The method 400 includes step 402 of forming a basement panel 22 within a mold 120. As discussed above, the basement panel 22 includes the integral thread-lock receiver 10 having the opposing retaining flanges 26 that are coupled to the remainder of the basement panel 22 via living hinges 28. The mold 120, at least at the location of the thread-lock receiver 10, is a two-piece mold 120 that is free of lifters. As exemplified in FIGS. 12 and 13, the two-piece mold 120 can include a stationary portion 130 that is typically in a fixed position. A linearly operable portion 132 can move in a single direction away from the fixed portion. A mold cavity 134 defined between the fixed portion and the linearly operable portion 132 forms the mold 120 for the basement panel 22. As discussed above, the outer surfaces 136 of the thread-lock receiver 10 are typically vertical or horizontal, or are placed at a slight angle. With this configuration, after the basement panel 22 is formed within the mold 120, the linearly operable portion 132 of the two-piece mold 120 can be linearly operated away from the fixed portion of the two-piece mold 120 and the thread-lock receiver 10 incorporated within the basement panel 22 can be easily removed from the two-piece mold 120. Again, this molding process can be performed without the use of lifters.

Referring again to FIGS. 1-14, according to the method 400, the electrical component 14 is linearly inserted into the thread-lock receiver 10 to define the inserted position 34 (step 404). In the inserted position 34, the opposing retaining flanges 26 are outwardly biased 30 away from a body 32 of the capacitor 16 and away from the planar top surface 54 of the basement panel 22. Additionally, in the inserted position 34, the thread-engaging surface 36 of the opposing retaining flanges 26 typically engages a portion of the threads 56 for the threaded stud 50 of the electrical component 14. Once in the inserted position 34, the electrical component 14 is then rotationally operated to define the secured position 24 (step 406). As discussed above, when the electrical component 14 is in the inserted position 34, rotational operation 38 of the electrical component 14 operates the opposing retaining flanges 26 toward the body 32 of the electrical component 14. In the secured position 24, the opposing retaining flanges 26 engage the body 32 of the electrical component 14 and, contemporaneously, the body 32 of the electrical component 14 also engages the planar top surface 54 of the basement panel 22. Through these engagements, the electrical component 14 can be substantially secured within the thread-lock receiver 10 and within the basement panel 22.

According to various aspects of the device, as exemplified in FIGS. 1-13, the axial position of the electrical component 14 in the inserted position 34 can be substantially similar to the axial position of the electrical component 14 in the secured position 24, with respect to the planar top surface 54 of the basement panel 22. It is also contemplated that the axial position of the electrical component 14 in the inserted position 34 may be offset from the planar top surface 54 of the basement panel 22. In such an embodiment, rotation of the electrical component 14 in the inserted position 34 will draw the opposing retaining flanges 26 toward the body 32 of the electrical component 14 and will also draw the body 32 of the electrical component 14 toward the planar top surface 54 of the basement panel 22.

According to various aspects of the device, the basement panel 22 having the thread-lock receiver 10 can be formed from various molding methods. These molding methods can include, but are not limited to, injection molding, blow molding, compression molding, combinations thereof, and other similar molding techniques.

In various aspects of the device, it is contemplated that the thread-lock receiver 10 can include a single retaining flange 26 that includes an operable segment 74 of the perimeter wall 70 and a plurality of fixed segments 76 that form the remainder of the segments for the perimeter wall 70. It is also contemplated that each of the segments that make up the perimeter wall 70 can be part of a separate retaining flange 26 that surrounds the central aperture 72 for the thread-lock receiver 10. Various combinations of operable segments 74 and fixed segments 76 of the perimeter wall 70 are also contemplated.

According to various aspects of the device, the basement panel 22 and the integral thread-lock receiver 10 can be made from various plastic materials that can include, but are not limited to, plastics, polymers, composite materials and other moldable materials that can be disposed within a mold 120 for forming the basement panel 22 and one or more thread-lock receivers 10 that are integrally formed therein.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body 32 with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A basement for a laundry appliance, the basement comprising:
    a basement panel comprising an electrical-component receiver; and
    an electrical component having a threaded stud that is axially inserted into the electrical-component receiver to define a secured position; wherein
    the electrical-component receiver includes opposing retaining flanges that are coupled to the basement panel via respective living hinges;
    the electrical-component receiver is free of internal recesses and includes a thread protrusion at each retaining flange of the opposing retaining flanges;
    the opposing retaining flanges are outwardly biased when the electrical component is placed in an inserted position; and
    the opposing retaining flanges are moved to the secured position when the electrical component is rotated in the inserted position, whereby each single thread protrusion engages the threaded stud of the electrical component.

2. The basement of claim 1, wherein the electrical component is a capacitor.

3. The basement of claim 1, wherein the electrical-component receiver is integrally formed within the basement panel.

4. The basement of claim 1, wherein the basement panel is an injection molded member, and wherein the electrical-component receiver is integrally formed as part of the injection molded member.

5. The basement of claim 1, wherein the single thread protrusion is positioned at an end of each retaining flange.

6. The basement of claim 1, wherein the electrical-component receiver includes at least one supplemental surface that is adjacent to the opposing retaining flanges.

7. The basement of claim 6, wherein the secured position of the electrical component is further defined by threads of the threaded stud being partially embedded within the at least one supplemental surface.

8. The basement of claim 2, wherein the capacitor includes the threaded stud that linearly and rotationally engages the electrical-component receiver to define the secured position, wherein the secured position is further defined by at least one retaining flange of the opposing retaining flanges engaging a body of the capacitor.

9. The basement of claim 1, wherein the basement panel is an injection molded member, and wherein the electrical-component receiver is integrally formed as part of the injection molded member.

10. The basement of claim 1, wherein the electrical-component receiver includes a plurality of surfaces that are substantially perpendicular to a top surface of the basement panel, and wherein the plurality of surfaces of the electrical-component receiver are free of internal recesses.

11. The basement of claim 9, wherein the basement panel is configured to be formed using a two-piece mold that is free of lifters.

12. A method for assembling a laundry appliance comprising steps of:
    forming a basement panel within a mold, wherein the basement panel includes an integral thread-lock receiver having opposing retaining flanges that are coupled to the basement panel via living hinges, wherein the mold at least at a location of the thread-lock receiver is a two-piece mold that is free of lifters;
    linearly inserting a capacitor into the thread-lock receiver to define an inserted position, wherein the opposing retaining flanges are biased outwardly and away from a body of the capacitor; and
    rotating the capacitor in the inserted position to operate the opposing retaining flanges toward the body of the capacitor to define a secured position.

13. The method of claim 12, wherein an axial position of the capacitor in the inserted position is substantially similar to the axial position of the capacitor in the secured position with respect to the basement panel.

14. The method of claim 12, wherein the step of forming the basement panel is performed via injection molding.

15. A basement for an appliance, the basement comprising:
    a basement panel comprising an electrical-component receiver;
    an electrical component that is disposed within the electrical-component receiver to define a secured position; wherein
    the electrical-component receiver includes at least one retaining flange that is coupled to the basement panel via a living hinge;
    the at least one retaining flange is outwardly biased away from a body of the electrical component when the electrical component is placed in an inserted position;
    the at least one retaining flange includes a thread-engaging surface that operates to the secured position upon rotation of the electrical component in the inserted position;
    the electrical-component receiver includes a plurality of surfaces that are substantially perpendicular to a top surface of the basement panel;
    the plurality of surfaces of the electrical-component receiver are free of internal recesses; and
    a mold for forming the basement panel is a two-piece mold that is free of lifters.

16. The basement of claim 15, wherein the electrical-component receiver is integrally formed within the basement panel.

17. The basement of claim 15, wherein the electrical component includes a threaded stud that linearly and rotationally engages the electrical-component receiver to define the secured position, wherein the secured position is further defined by the at least one retaining flange engaging the body of the electrical component.

18. The basement of claim 15, wherein the at least one retaining flange includes opposing retaining flanges, and wherein each retaining flange of the opposing retaining flanges includes the living hinge that integrally couples the opposing retaining flanges to the basement panel, respectively.

19. The basement of claim 15, wherein the basement panel is an injection molded member, and wherein the electrical-component receiver is integrally formed as part of the injection molded member.

20. The basement of claim 15, wherein the thread-engaging surface of the at least one retaining flange includes an outer thread member, wherein the outer thread member is positioned at an end of the at least one retaining flange.

* * * * *